United States Patent

Scarbrough

[15] 3,685,145

[45] Aug. 22, 1972

[54] METHOD OF MAKING A BATCH FABRICATED MAGNETIC WIRE MEMORY

[72] Inventor: Alfred D. Scarbrough, Northridge, Calif.

[73] Assignee: The Bunker-Ramo Corporation, Oak Brook, Ill.

[22] Filed: Oct. 8, 1969

[21] Appl. No.: 864,789

[52] U.S. Cl. ......................29/604, 29/625, 174/68.5, 340/174 PW, 340/174 TF

[51] Int. Cl. ..............................................H01f 7/06

[58] Field of Search..........29/604, 625; 340/174 PW, 174 MA, 340/174 TF; 174/68.5

[56] References Cited

UNITED STATES PATENTS

| | | | |
|---|---|---|---|
| 3,504,357 | 3/1970 | Reid | 340/174 PW |
| 3,499,219 | 3/1970 | Griff et al. | 174/68.5 X |
| 3,279,969 | 10/1966 | Borchardt | 29/625 X |
| 3,466,206 | 9/1969 | Beck | 29/625 X |

*Primary Examiner*—John F. Campbell
*Assistant Examiner*—Carl E. Hall
*Attorney*—Frederick M. Arbuckle

[57] ABSTRACT

A magnetic wire memory construction and method of making in which the memory comprises a plurality of stacked memory planes having memory wires inserted in aligned holes thereof. Each memory plane is fabricated using precision batch fabricated selective chemical etching techniques on a single self-supporting metal sheet so as to form pairs of insulated drive lines within the sheet looping around respective rows of a row-column matrix of memory wire receiving holes. Additional metal and magnetic layers may be provided over the surfaces of the sheets for increasing shielding and reducing memory cell disturbances.

8 Claims, 15 Drawing Figures

INVENTOR
ALFRED D. SCARBROUGH
BY Nathan Cass
ATTORNEY

INVENTOR
ALFRED D. SCARBROUGH
BY Nathan Cass
ATTORNEY

INVENTOR
ALFRED D. SCARBROUGH
BY
Nathan Cass
ATTORNEY

METHOD OF MAKING A BATCH FABRICATED MAGNETIC WIRE MEMORY

BACKGROUND OF THE INVENTION

The present invention relates generally to a magnetic memory and to a method of construction thereof. More particularly, the invention relates to a magnetic memory of the type employing wire-like memory elements.

It is well recognized that the construction of a magnetic wire memory presents significant problems which can result in increased fabrication costs and/or degraded memory performance. Such problems involve, for example, memory wire insertion, drive and sense line interconnected requirements, cross-talk, excessive heating, lack of uniformity, noise cancellation, etc.

SUMMARY OF THE PRESENT INVENTION

The present invention is directed to a magnetic wire memory construction and fabrication method therefor which makes possible the provision of an improved magnetic wire memory which significantly reduces the problems heretofore associated with such memories.

Briefly, a basic feature of the present invention resides in the use of precision batch fabricated metal sculpturing techniques on a metal sheet so as to form a memory plane having memory wire receiving holes and insulated conductive drive lines at predetermined locations with an accuracy, shielding, and heat dissipation capability significantly better than has heretofore been possible. A plurality of such memory planes can be stacked and memory wires inserted in respective aligned wire receiving holes of the stacked memory planes so as to thereby form an improved three-dimensional wire memory structure.

The specific nature of the invention as well as other features, objects, advantages and uses thereof will become apparent from the following description of the invention taken in conjunction with the accompanying drawings in which:

FIG. 1 schematically illustrates how drive lines and memory wire receiving holes may typically be provided in a memory plane fabricated in accordance with the invention;

Like numerals designate like elements throughout the figures of the drawings. Also, for the sake of clarity, certain thicknesses shown in the drawings have been exaggerated.

Figure 1:
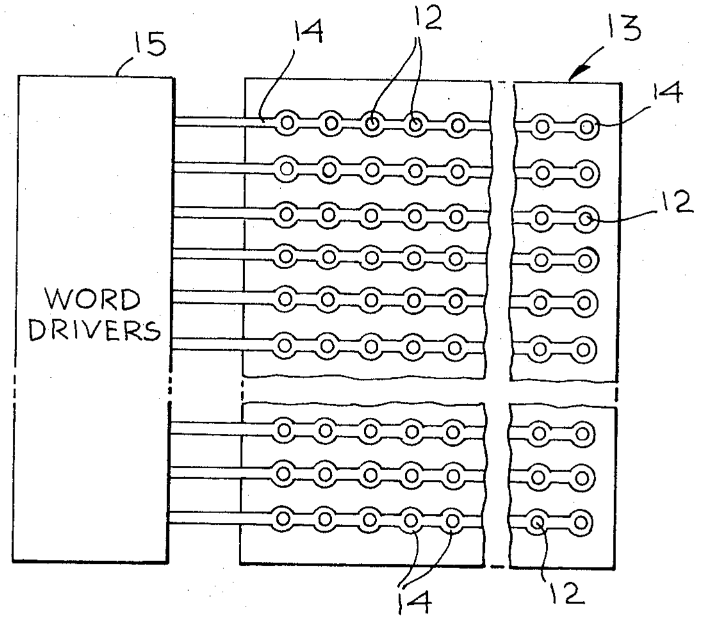

Referring initially to FIG. 1, illustrated therein is the manner in which memory wire receiving holes 12 may typically be arranged in a memory plane 13 in a row-column matrix with rows of drive lines 14 looping around respective rows of receiving holes 12 so as to form a single turn coil around each hole. The drive lines 14 are fed by a plurality of word drivers 15 in a conventional manner.

Figure 2:
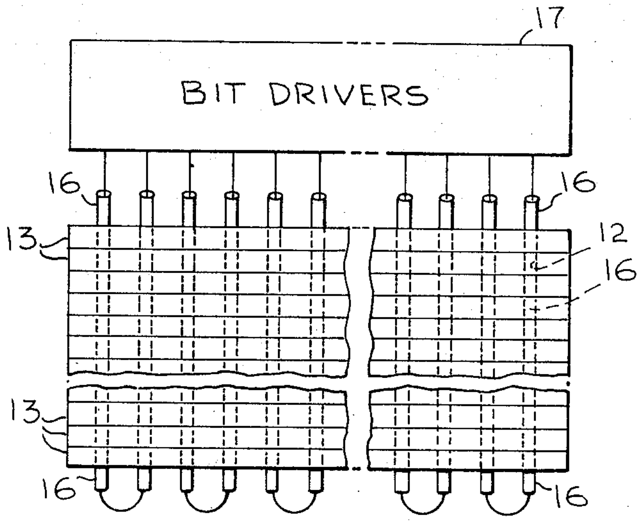
FIG. 2 illustrates how a plurality of memory planes arranged as shown in FIG. 1 may be stacked to provide a three-dimensional memory with memory wires inserted in respective aligned memory wire receiving holes thereof.

FIG. 2 illustrates a three-dimensional magnetic wire memory formed by stacking a plurality of the memory planes 13 of FIG. 1 with their memory wire receiving holes 12 aligned to form tunnels into which memory wires 16 are respectively inserted. Each of the memory wires 16 may typically be a conventional type of magnetic plated wire comprising a beryllium copper inner wire having, for example, a diameter of 0.0005 inch and on which is plated an essentially single domain, circumferentially oriented thin film of bistable magnetic material of, for example, 10,000 Angstroms. As is also conventional, the inner wires of the memory wires 16 in FIG. 2 are electrically connected in pairs at one end and driven by a plurality of bit drivers 17 at the other end. It will be understood that the word and bit drivers 15 and 17 in FIGS. 1 and 2 may cooperate in a known manner to permit digital data to be written into and read out from a selected plurality of memory wire cells, each memory wire cell being located at the intersection between a bit wire 16 and a respective pair of drive lines 14.

Referring now to FIGS. 3–14 in connection with FIG. 1, it will be noted that these figures merely illustrate the fabrication of a single memory wire receiving hole 12 and the portions of the associated drive lines 14 in the immediate vicinity thereof. However, it is to be understood that a plurality of like fabrications are simultaneously being performed for every other memory wire receiving hole and associated drive lines to be provided in the memory plane. Accordingly, the description and illustration of construction and fabrication in accordance with the invention for the single memory wire receiving hole and associated drive lines will suffice to describe the fabrication of all such memory wire receiving holes and drive lines which may typically be arranged as illustrated in FIG. 1.

Figure 3:
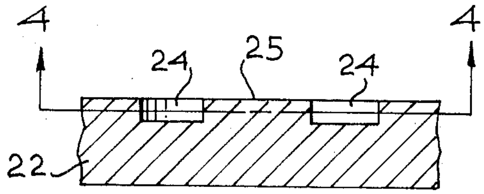
FIGS. 3–12 are fragmentary cross-sectional edge and plan views taken along the lines indicated illustrating stages in the fabrication of a memory plane in accordance with the invention.
Figure 4:
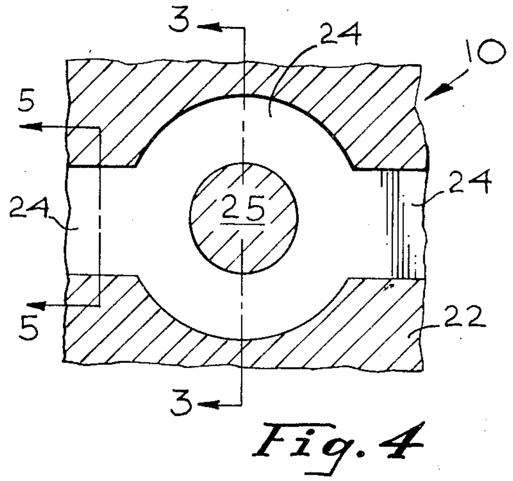
Figure 5:
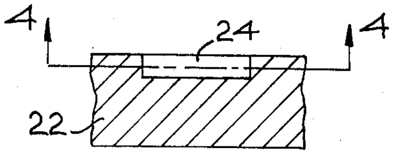

FIGS. 3–5 illustrate an initial stage in the fabrication of a memory plane. A self-supporting metal plate or sheet 22 of, for example, beryllium copper has recesses 24 formed therein, such as by the use of known precision selective chemical etching techniques. These recesses 24 will be seen to generally correspond to the paths indicated in FIG. 1 to be followed by the drive lines 14 in the immediate vicinity of a memory wire receiving hole 12 which will eventually be formed coincident with the circular area indicated in FIGS. 3–5 by the numeral 25.

Figure 6:
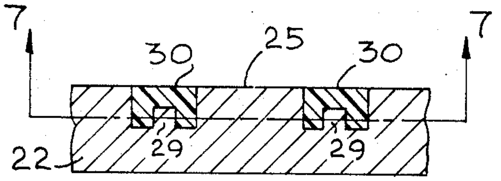
Figure 7:
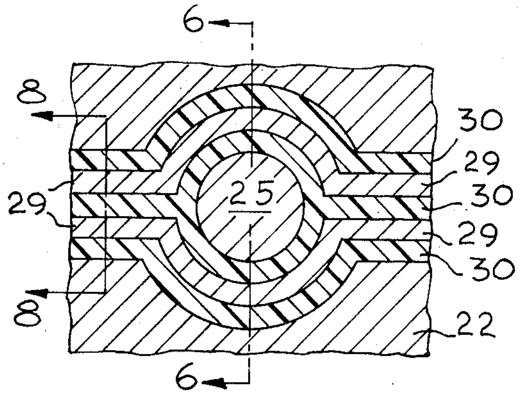
Figure 8:
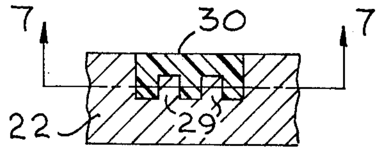

As illustrated in FIGS. 6–8, spaced strip portions of the bottom of the recesses 24 in FIGS. 3–5 are further selectively chemically etched so as to form raised conductive strips 29 at locations respectlvely corresponding to the locations desired for the drive lines 14 in FIG. 1, the resulting recesses being filled with dielectric material 30 which is ground flush with the surface of the metal sheet 22.

Figure 9:
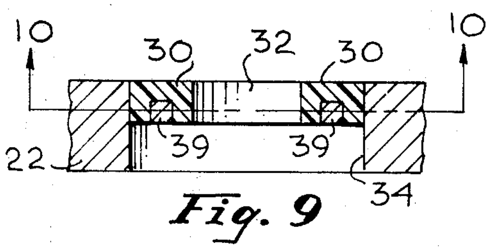
Figure 10:
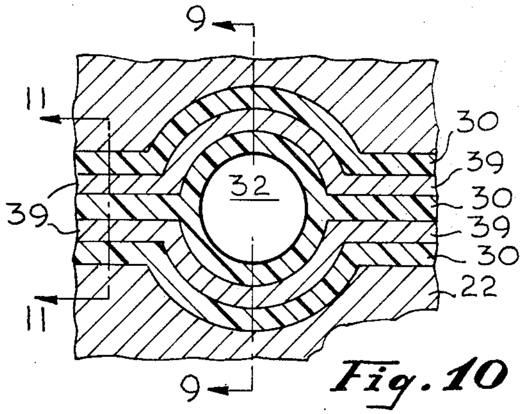
Figure 11:
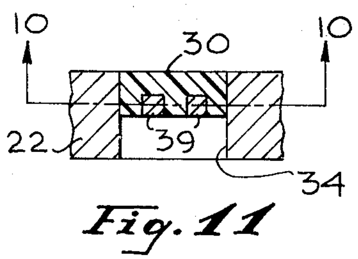

FIGS. 9–11 illustrate a later stage in the fabrication where a hole 32 has been formed in the sheet 22 corresponding to each memory wire receiving hole 12 in FIG. 1, and where recesses 34 have also been formed in the opposite surface of the metal sheet 22 having a diameter and depth sufficient to electrically isolate each raised conductive strip 29 and thereby form insulated conductive strips 39 supported by respective dielectric material 30, and corresponding to the drive lines 14 in FIG. 1. The holes 32 and recesses 34 in FIGS. 9–11 may be provided using known precision selective chemical etching techniques with either one being formed first.

It is to be understood that a plurality of memory planes, each having the construction and arrangement illustrated in FIGS. 1 and 9–11, could be stacked in aligned fashion to form the three-dimensional magnetic wire memory illustrated in FIG. 2. However, it is of advantage in certain applications to add to the structure of FIGS. 9–11 either or both of the additional conductive and high permeability magnetic layers 36 and 38 illustrated in FIG. 12. The conductive layers 36 may be provided over the surfaces of the metal sheet 22 except for the holes 32 so as to achieve greater shielding as a result of the conductive encirclement thereby obtained around each pair of conductive strips 39 which correspond to a pair of drive lines 14 in FIG. 1. Also, a high permeability magnetic layer 38 may be provided over one or both of the conductive layers 36 if present, or over the surfaces of the metal sheet 22 except for the holes 32. These magnetic layers 38 serve to reduce magnetic coupling between memory cells and also to reduce memory cell disturbance by the earth's magnetic field.

Figure 12:
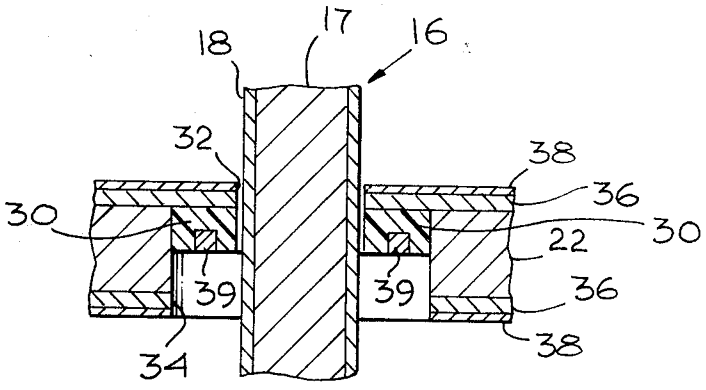

It will be noted that FIG. 12 further illustrates a portion of a memory element 16 passing through the hole 32, such as occurs when the memory plane is stacked as illustrated in FIG. 2. As described previously, the memory element 16 may comprise a beryllium copper inner wire 17 having a bistable thin magnetic film 18 provided thereon.

Figure 13:
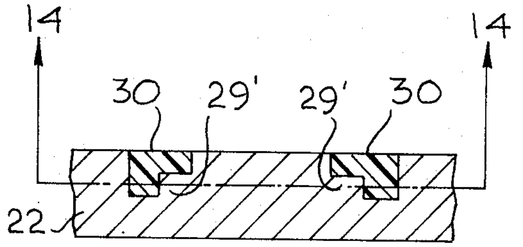
FIGS. 13–15 are fragmentary cross-sectional edge and plan views taken along the lines indicated illustrating the fabrication of a modified memory plane in accordance with the invention.
Figure 14:
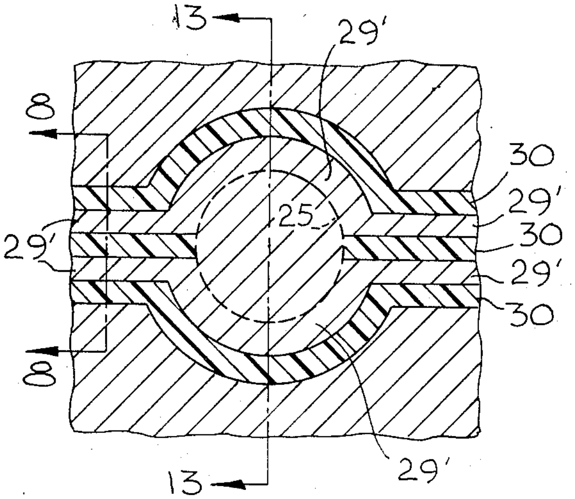
Figure 15:
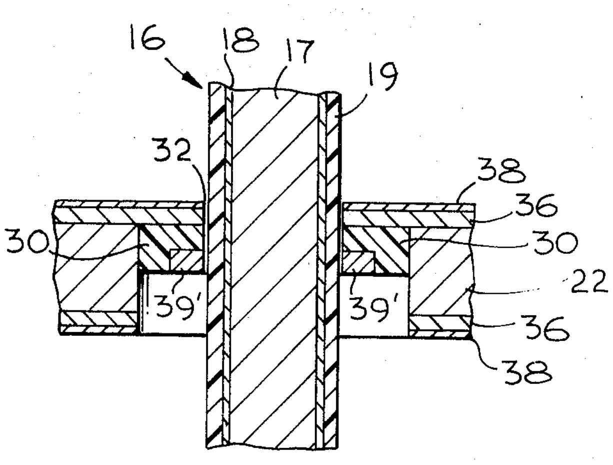

FIGS. 13–15 illustrate the fabrication of a modified memory plane construction in accordance with the invention. The modified fabrication stage illustrated in FIGS. 13 and 14 is provided following the stage illustrated in FIGS. 3–5 instead of the previously described stage illustrated in FIGS. 6–8. FIGS. 13 and 14 are similar views to those of FIGS. 6 and 7, respectively, while FIG. 8 is the same for the modified construction and is thus not repeated. It will be noted that the only difference introduced by the modified stage of FIGS. 13 and 14 is that there is no etching of the bottom edge of the recess 24 in FIGS. 3 and 4 in the area immediately adjacent the circular area 25 corresponding to the location of the later formed memory wire receiving hole. The conductive step 29' illustrated in FIGS. 13 and 14 is thus formed instead of the raised conductive strip 29 shown in FIGS. 6 and 7. Accordingly, when fabrication is continued in the same manner as previously described in connection with FIGS. 9–12, the resulting modified structure will then have the construction illustrated in FIG. 15 in which the insulated conductive strips 39' forming the drive lines are immediately adjacent the hole 32 constituting the memory wire receiving hole, instead of spaced therefrom as in FIG. 12. It will be understood that such a construction requires the memory element 16 to additionally be provided with an insulative outer coating 19, as illustrated in FIG. 15, in order to guard against shorting of the strips 39'.

Although the invention has been described in connection with particular embodiments thereof, it is to be understood that the construction, arrangement, fabrication and/or use of the invention is subject to considerable variations and modifications without departing from the scope of the invention as defined in the appended claims.

The embodiments of the invention in which an exclusive property or privilege is claimed are defined as follows:

1. A method of fabricating a memory plane from a conductive planar body,
   providing a self-supporting metal sheet for use as said conductive planar body,
   forming recesses in one surface of said planar body shaped so that said recesses contain raised conductive portions following paths respectively corresponding to the locations desired for drive lines to be provided for said plane,
   providing supporting dielectric material in said recesses between said conductive portions and said planar body,
   forming recesses in the other surface of said planar body respectively opposite those formed in said one surface and each having a location, width and depth relative to a respective opposite recess formed in said one surface so as to electrically isolate said raised conductive portions from each other and from said planar body and so as to thereby form insulated drive lines for said plane supported wholly within said planar body by said dielectric material, and
   forming memory element receiving holes in said planar body at predetermined locations of said recesses
   said drive lines and said memory element receiving holes being located so that said drive lines form loops about respective groups of said memory element receiving holes.

2. The invention in accordance with claim 1,
   wherein said raised conductive portions depend from the bottoms of the recesses formed in said one surface and rise a distance less than the distance to said one surface so that the resulting drive lines are wholly within said planar body and recessed from both surfaces thereof.

3. The invention in accordance with claim 2,
   wherein the recesses with raised conductive portions are formed in said one surface by first forming initial recesses having a depth corresponding to the outer surfaces of said raised conductive portions, and then removing material from selected portions of the bottoms of said initial recesses so as to form said raised conductive portions.

4. The invention in accordance with claim 2,
   wherein said receiving holes are arranged in rows,
   wherein the recesses in said one surface of the planar body are formed so as to interconnect and encircle the areas in respective rows corresponding to the locations at which said holes are to be formed, and
   wherein a pair of drive lines is provided for each row of holes with the drive lines passing on opposite sides thereof.

5. The invention in accordance with claim 1,
   wherein said method includes the additional step of providing a conductive layer adjacent and in electrical contact with at least one surface of said planar body.

6. The invention in accordance with claim 1, wherein said method includes the additional step of providing a magnetic layer adjacent at least one of the surfaces of said planar body.

7. The invention in accordance with claim 1, wherein said recesses and holes are formed using precision selective chemical etching techniques.

8. The invention in accordance with claim 1, wherein said method includes the additional steps of stacking a plurality of said planar bodies with their receiving holes aligned, and inserting memory wire elements into respective aligned holes.

* * * * *